Figure 1:
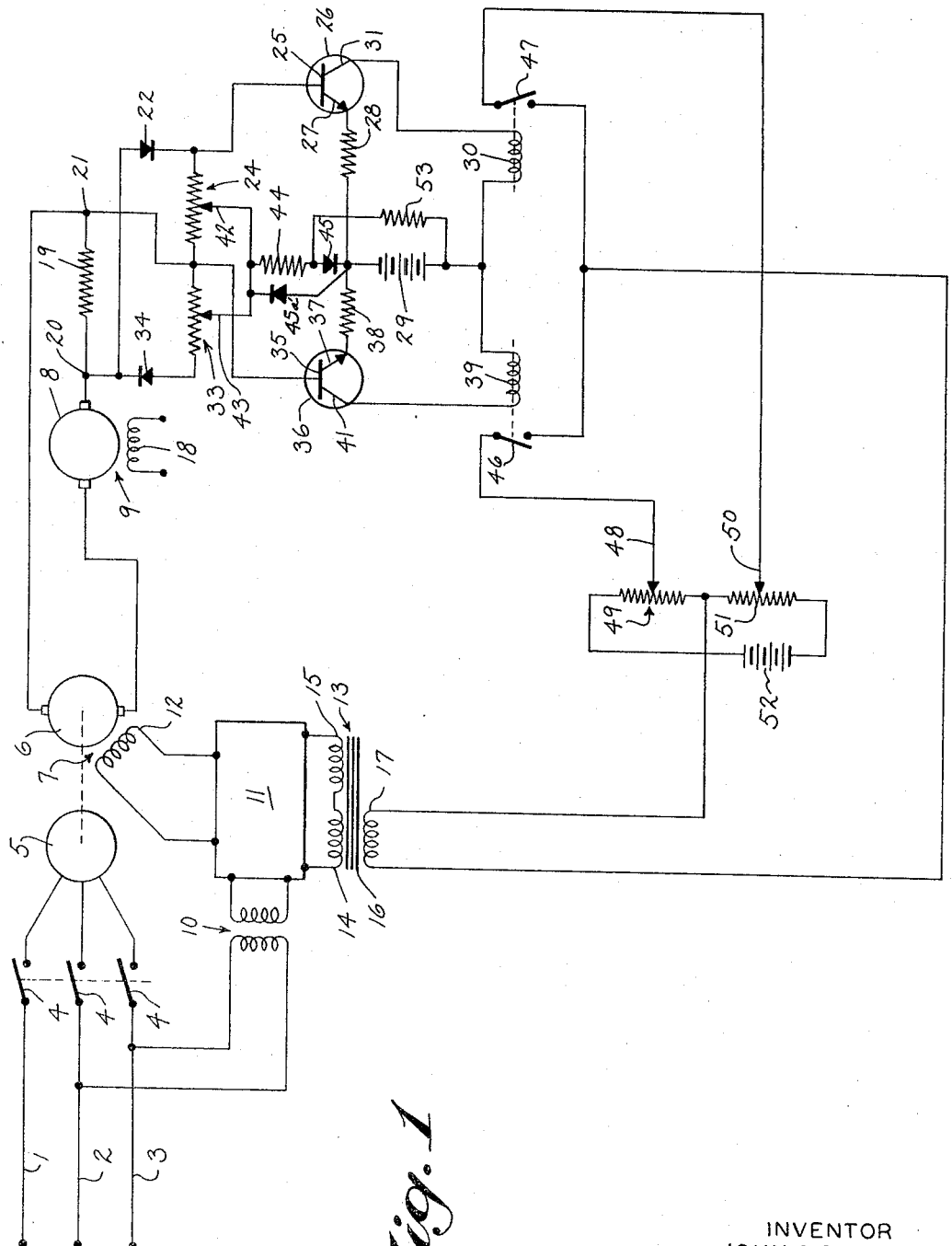

INVENTOR
JOHN G. SAFAR

BY Thomas O. Kloehn

ATTORNEY

Feb. 21, 1967 J. G. SAFAR 3,305,720
ARMATURE CURRENT LIMITING CIRCUIT FOR A DIRECT CURRENT MOTOR
Filed March 2, 1964 2 Sheets-Sheet 2

INVENTOR
JOHN G. SAFAR

BY Thomas O. Kloehn

ATTORNEY

United States Patent Office 3,305,720
Patented Feb. 21, 1967

3,305,720
ARMATURE CURRENT LIMITING CIRCUIT FOR A DIRECT CURRENT MOTOR
John G. Safar, Milwaukee, Wis., assignor to Allen-Bradley Company, Milwaukee, Wis., a corporation of Wisconsin
Filed Mar. 2, 1964, Ser. No. 348,456
6 Claims. (Cl. 318—328)

The present invention relates to a current limiting circuit for limiting the amplitude of a signal in a system: and more specifically, the invention resides in the combination of a pair of input terminals connected through a signal magnitude sensitive current valve which will emit an output signal when the amplitude of an input signal across said input terminals rises to a predetermined value; and a control element for a power source, which control element is connected to receive the output signal from said signal magnitude sensitive current value and apply it to the control of a power source.

A current limiting circuit embodying the present invention may be used in any system where it is desired to limit the magnitude of a signal value to a predetermined maximum. The present invention was created in response to the need for such a current limiting device in a motor control circuit, and accordingly the embodiments illustrated herein relate to such motor controls. In an overload condition, the armature of an electric motor will tend to draw large amounts of current due to its reduction in speed resulting a corresponding reduction in back E.M.F. Such heavy current loads may prove deleterious to the motor armature or to the entire control system or both. Hence, in many applications some means is required to limit the current load to a predetermined maximum which provides an adequate safety factor for the system. Also, to decelerate such motors power to the armature is either drastically reduced or eliminated altogether and the motor may be permitted to coast to the predetermined lower speed, under the inertia of its load. However, while the motor is decelerating the armature continues to function as a generator, so that what was the back E.M.F. during normal operation becomes a current output during deceleration in a direction opposite to that required to drive the motor. In some systems such as in the M-G system illustrated in FIG. 1 the current generated by the decelerating armature may prove injurious to the converter, in this case the generator, and hence means are required to prevent the flow of this current through the converter. Therefore, the current limiting circuit according to the present invention may be utilized to energize the converter at a predetermined value of armature current to produce an output bucking the generated power of the motor.

Accordingly, it is an object of the present invention to provide a current limiting circuit capable of controlling the maximum value of current.

It is another object of the present invention to provide a bi-directional current limiting circuit for limiting the value of signals of opposite polarity.

It is another object of the present invention to provide a current limiting circuit having a minimum number of comparatively low cost, stable and reliable components.

It is another object of the present invention to provide a current limiting circuit capable of functioning to very precise current values.

It is another object of the present invention to provide a current limiting circuit capable of gradually applying a current limitation to a system.

The foregoing and other objects will appear in the description to follow. In the description, reference is made to the accompanying drawings which form a part hereof and in which there is shown by way of illustration several specific embodiments in which this invention may be practiced. These embodiments will be described in sufficient detail to enable those skilled in the art to practice this invention, but it is to be understood that other embodiments of the invention may be used and that structural changes may be made in the embodiments described without departing from the scope of the invention. Consequently, the following detailed description is not to be taken in a limiting sense; instead, the scope of the present invention is best defined by the appended claims.

Figure 2:
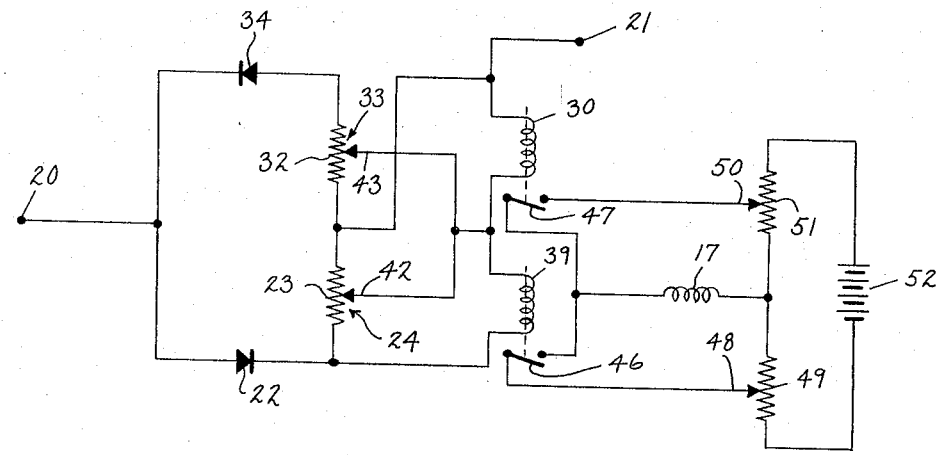
Figure 3:
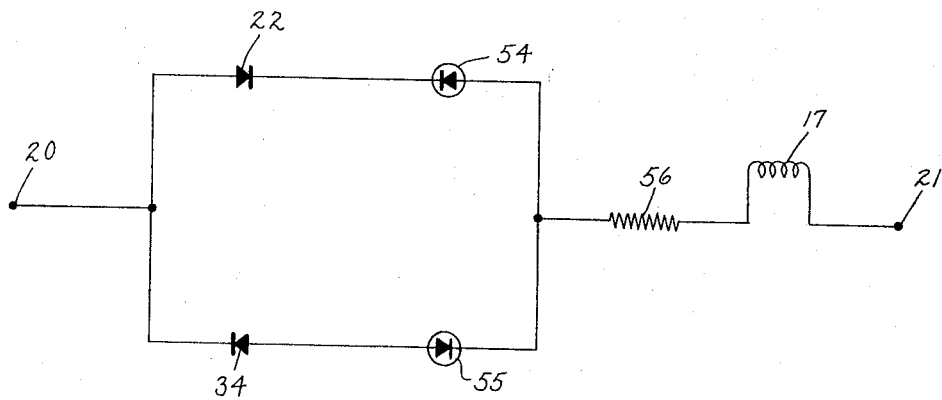

In the drawings:

FIG. 1 is a schematic diagram of an embodiment of the present invention to control a direct current motor driven by an M-G unit, FIG. 2 is a schematic diagram of another embodiment of the present invention utilizing relays and resistors to provide the signal amplitude sensing current valve, and FIG. 3 is a schematic diagram of a third embodiment of the present invention utilizing zener diodes as its signal amplitude sensing devices.

Referring now specifically to the drawings, in FIG. 1 power lines 1, 2 and 3 are connected through starter contacts 4 to an alternating current motor 5. The alternating current motor 5 is mechanically connected to drive the armature 6 of a direct current generator 7. The output of the direct current generator is connected across the armature 8 of a direct current motor 9. The power lines 3 and 4 are connected through a transformer 10 to provide power for a power supply 11 which provides the power to the field winding 12 of the generator 7. The control of the power supply 11 is a saturable reactor 13 represented by the gate coils 14 and 15, the core 16 and the control coil 17. The power supply 11 is a commercially available item which requires no further description here. The direct current motor 9 has a field winding 18 which is connected to an appropriate excitation source not shown here.

A drop resistor 19 is connected in series with the motor armature 8 and input terminals 20 and 21 to the current limit of the present invention are connected at opposite ends of the drop resistor 19. The input terminals 20 and 21 are connected through two parallel paths, one of which will conduct armature current during motoring and the other of which will conduct armature generated current during deceleration. The motor current carrying path is connected to the armature 8 of the motor 9 between the armature 8 and the drop resistor 19 and passes through a unidirectional current valve in the form of a diode 22 after which the path branches, in one direction through a potentiometer 24 and back to the input terminal 21, and in the other direction to a base 25 of an amplifier transistor 26. The amplifier transistor 26 has its emitter 27 connected through a current limiting resistor 28 to the negative end of a unidirectional power source in the form of a battery 29, and through the battery 29 and a relay coil 30 back to the collector 31.

A current path for armature generated current is provided beginning at the input terminal 21 and branching one way through a potentiometer 33 and a unidirectional current valve in the form of the diode 34 to the input terminal 20, and the other way to a base 35 of an amplifier transistor 36. The amplifier 36 has its collector 37 connected through a current limiting resistor 38 and the battery 29 and a relay coil 39 of a relay 40 and back to a collector 41 of the transistor 36.

The emitters 27 and 37 of the two transistors 26 and 36 are connected through their respective current limiting resistors 28 and 38 along with a negative pole of the battery 29 through a temperature stabilizing diode 45 and a second current limiting resistor 44 to the sliders 42 and 43, respectively, of the potentiometers 24 and 33. A current limiting resistor 53 presents a shunt path around the battery 29 and temperature stabilizing diodes 45 and 45a which have a negative temperature coefficient. The battery 29 and the above described circuitry also provide a bias across the bases 25 and 35 and emitters 27 and 37 to bias the transistors 26 and 36 in a normally off condition so that an input signal from the motor armature 8 must overcome that bias to cause control current to flow.

The relay coils 30 and 39 actuate contacts 46 and 47, respectively, which have one side in common connection. The other side of the relay contact 46 is connected to a slider 48 on a potentiometer 49, and the other side of the other relay contact 47 is connected to a slider 50 on a potentiometer 51. The potentiometers 49 and 51 are connected in series across the terminals of the unidirectional control signal power source in the form of a battery 52. The junction between the potentiometers 49 and 51 and the common connection of the relay contacts 46 and 47 are connected together through the control winding 17 of the saturable reactor 13 on the supply 11 for the field winding 12 of the generator 7.

Before proceeding with a description of the embodiment shown in FIGS. 2 and 3, the operation of the first embodiment will be described. When the constant speed alternating current motor 5 is connected across the power lines 1, 2 and 3 by the starter contacts 4, it drives the generator 6. Meanwhile, power is being delivered to the field winding 12 of the generator 6 through the power supply 11 and the transformer 10 which is connected to the power lines 2 and 3. The output of the generator 6 is connected across the armature 8 of the direct current motor 9. The field excitation for the motor 9 and the armature control for the motor 9 are not shown here, but they may be of any of the conventional varieties.

During normal running of the motor 9 armature current passing through the drop resistor 19 will create a voltage drop such that a portion of the armature current will tend to flow from the input terminal 20 through the current limiting circuit shown. The diode 34 will prevent armature current from flowing through the deceleration limiting circuit, leaving only the motor overload limiting circuit open. While the current from normal operation may pass through the diode 22 in the overload circuit, the voltage drop thus created across the potentiometer 24 cannot overcome the bias to permit base current to flow to produce a transistor output. However, in the event of an overload, the resulting surge of current through the armature circuit will produce an input signal sufficient to overcome the bias and render the transistor 26 conductive so that current from the battery 29 may energize the coil 30 closing the contacts 47. In that event, a circuit will be completed for control current from the battery 52 through the contacts 47, the slider 50 on the potentiometer 51 and the control winding 17, passing through the latter from right to left in the drawing. The effect of this current in the control winding 17 will be to limit the output of the generator 6 by reducing the power in the field 12, and thus preventing the motor 9 from drawing an excessive amount of current through its armature 8 during the overload situation.

If the energy to the field 12 of the generator 7 is drastically reduced to decelerate or stop the motor 9, the motor 9 may begin generating a current in its armature 8 back through the generator 7. That generated current passing through the drop resistor 19 will create a voltage drop across the current limit input terminals 20 and 21 such that a portion of the generated current will seek to enter the current limit circuit through the other input terminal 21. When the level of that portion of the generated current entering the current limiting circuit through the input terminal 21 to the base 35 of the amplifier transistor 36 reaches a predetermined level, it will cause amplifier 36 to conduct sufficient current through its emitter from the battery 29 and thence through the coil 39 and back to its collector 41 to actuate the contacts 46. When the contacts 46 are closed, a second circuit is created for the energy from the unidirectional control current source 52. In the second control circuit the current will flow from the positive end of the battery 52 up through the potentiometer 49 and its slider 48, then back through the contacts 46 and up through the control coil 17, from left to right in the drawing, and thence back through the potentiometer 51 to the source 52. This current, being in the opposite direction from that for the overload situation will tend to effect a greater output to the field 12 of the generator 6 so that the generator will produce sufficient current to buck the E.M.F. generated by the decelerating motor 9. Hence, the system is protected against armature current generated during motor deceleration.

In the first embodiment shown in FIG. 1, a shunt resistor 53 creates a path around the source 29 and the diode 45. The diodes 45 and 45a are part of a single package component containing the two amplifiers 26 and 36 and are inserted therein because they have reverse temperature coefficients and hence will aid in dissipating the heat from the transistors 26 and 36. This circuitry also provides a path for bias current rendering the transistors 26 and 36 normally off.

The potentiometers 33 and 24 may be used to vary the precise point at which the deceleration and overload limits respectively will be actuated, but where applicable fixed impedances may be used. The potentiometers 49 and 51 in the control current circuit may be used to set the precise amount of control current desired in the control winding 17 for either the overload or the deceleration situation, but once again fixed impedances may be used for this purpose. Batteries 29 and 52 are shown in the diagram as the sources of current for energizing the relay coils 39 and 30 and the control coil 17, respectively, but the showing of batteries 29 and 52 is but illustrative of any unidirectional current source and in a commercial circuit the sources of current would probably come from a rectifier connected across the power lines 1, 2 and 3.

Turning now to the second embodiment, once again the input terminals 20 and 21 are joined by two current paths, each containing a unidirectional current valve in the form of diodes 22 and 34. Again, potentiometers 33 and 24 join the two diodes. Relay coils 30 and 39 have one end connected in common, to which the sliders 42 and 43 of the potentiometers 23 and 32 are connected. The opposite end of the relay coil 30 is connected between the two potentiometers 23 and 32 and the other end of the relay coil 39 is connected to the diode 22. The input terminal 21 is also connected between the two potentiometers 23 and 32. The coils 30 and 39 actuate contacts 46 and 47, as in the first embodiment, and these contacts 46 and 47 have one side connected in common and their opposite sides connected respectively to sliders 48 and 50 on potentiometers 49 and 51. The potentiometers 49 and 51 are connected across the output of a unidirectional current source in the form of the battery 52. Finally, a point between the contacts 46 and 47 and the potentiometers 49 and 51 is joined through the output means which here again is the control coil 17.

It will be noted that the primary difference between the second embodiment and the first embodiment is that the second embodiment does not have the amplifiers 26 and 36 with their current source 29 shown in the first embodiment. Instead, the armature current passing in through either of the input terminals, when it reaches a sufficient level will energize the relay coils 30 or 39 to permit the control current from the source 52 to pass through the control winding 17 in one direction or other, depending upon whether the current limiting circuit is energized by an overload condition or a motor deceleration condition.

FIG. 3 illustrates the most rudimentary and inexpensive form of the present invention. In FIG. 3, the input terminals 20 and 21 are joined through the control winding 17, which is in series with both the overload and deceleration current paths, so that the armature current itself provides the control current for the generator field power supply 11. In this embodiment, the overload current conducting diode 22 is connected in series with an overload control zener diode 54, the deceleration current conducting diode 34 is connected in series with a deceleration current limit control zener diode 55, and both the branches are connected in parallel with each other and in series with a current limiting resistor 56 and the control coil 17. In this embodiment, the zener diodes 54 and 55 will be selected to have a break over point appropriate for the system in which the circuit is to be used.

When the third embodiment is presented with a motor overload situation of sufficient magnitude, current entering through the input terminal 20 will pass through the diode 22, break down the zener diode 54 so that it may pass through the current limiting resistor 56 and the control coil 17 as a control current. In a deceleration condition where the armature generated current reaches sufficient magnitude it will pass into the input terminal 21, through the control coil 17 and the current limiting resistor 56, breaking down the zener diode 55 and from there out through the diode 34 in the input terminal 20.

It will be evident that while the third embodiment is the least expensive it is also the least accurate of the three embodiments and will not produce the sharp limiting action possible with either the second or first embodiment. It is also apparent that in the third embodiment the magnitude of the armature current will determine the magnitude of the control current, whereas in the first and second embodiments the magnitude of the control current was independent of the armature current. However, in the second embodiment, if it is desired to implement the current limiting circuit gradually it is possible to substitute the current flowing through either of the alternative paths of the current limit circuit for the battery 52 and thus achieve a control current proportional to the magnitude of the armature current.

Although the foregoing embodiments have been described in terms of a specific type of motor control utilizing a common M-G unit, it will be apparent to one skilled in the art that this circuit also has many other applications where different types of motor controls are employed, and in connection with power supplies for devices other than motor controls. Clearly, the output signal which is shown in the presently disclosed embodiments to be imposed across a control coil 17 could as well be introduced on a grid of tube, or a gate of an SCR, or a control coil of a magnetic amplifier, or any number of other commonly used devices. Hence, the present invention in its broadest application will be deemed usable in any controlled power supply for any purpose. Accordingly, the breadth of the invention is to be determined, not from the specific embodiments described above, but rather from the claims to follow:

I claim:
1. In an armature current limiting circuit for a direct current motor, the combination comprising:
  a direct current motor armature;
  a controllable armature current power supply connected to energize said armature and having a control element;
  a pair of input terminals connected across a voltage drop in series with said armature;
  a motor current amplifier having a base, an emitter and a collector, said base and emitter being connected across said input terminals in series with a diode oriented to conduct armature current from said power supply;
  an armature overload relay having a coil and a set of contacts, said overload relay coil being connected across the emitter and collector of said motor current amplifier;
  a deceleration current amplifier having a base, an emitter and a collector, said base and said emitter being connected in series with a diode oriented to conduct current generated in said motor armature across said input terminals;
  a motor deceleration relay having a coil and a set of contacts, said deceleration relay coil being connected across said collector and said emitter of said deceleration current amplifier;
  an amplifier signal source being connected in series with said emitter and said collector of both of said amplifiers, and being connected to provide a bias across said emitter and said base of each of said amplifiers rendering said amplifiers normally nonconducting;
  and an output circuit containing an output signal source, said control element of said motor armature power supply, and said relay contacts, said source and control element and relay contacts connected together such that the actuation of one of said relay contacts imposes a signal from said source on said control element of opposite polarity from a signal imposed on said control element by actuation of the other relay contacts.

2. An armature current limiting circuit for a direct current motor comprising the combination of
  a controllable direct current power source having a control element for controlling its output responsive to an electrical control signal;
  a direct current motor having an armature connected to be energized by said controllable direct current power source;
  an armature current detector connected to said armature and adapted to emit an electrical output signal proportional to the magnitude of armature current and having polarity corresponding to the polarity of said armature current;
  a pair of circuits electrically connected to said armature current detector to receive said output signal, one of said circuits containing a diode connected to conduct said output signal of one polarity only, and the other of said circuits containing another diode connected to conduct said output signal of opposite polarity,
  each of said circuits containing at least one element adapted to emit an electrical control signal when the magnitude of said output signal from said armature current detector exceeds a predetermined maximum and being connected to said control element of said direct current power source to impart said electrical control signal to said control element.

3. An armature current limiting circuit as set forth in claim 2 wherein
  said armature current detector is a resistor connected in series with said armature and has terminals in series with each end of said resistor from which said output signals may be emitted.

4. An armature current limiting circuit as set forth in claim 2 wherein
  said controllable direct current power source is a generator having a field winding controlled by a magnetic amplifier controlled power supply;
  and said control element is a coil of said magnetic amplifier.

5. An armature current limiting circuit as set forth in claim 2 wherein said element adapted to emit an electrical control signal when the magnitude of said output signal from said armature current detector exceeds a predetermined maximum comprises
  a zener diode connected in series with each of said diodes and having reverse breakover characteristics such as to conduct said electrical control signal when the voltages of the currents conducted by said diodes exceed said predetermined maximum;

and said circuits being electrically connected to said control element to impart said electrical control signal to said control element.

6. An armature current limiting circuit as set forth in claim 2 wherein said elements adapted to emit an electrical control signal when the magnitude of said output signal from said armature current detector exceeds a predetermined maximum comprise one each of a pair of potentiometers with a resistive element and a sliding contact, having said resistive element connected to each of said pair of diodes;

one each of a pair of coils of a pair of relays connected from one of each of said diodes to said sliding contact of said potentiometer connected to the same diode;

a contact of one of said pair of relays connected in series with a unidirectional control signal source and with said control element to conduct a control signal of one polarity through said control element when it is closed;

and a contact of the other of said pair of relays connected in series with said unidirectional control signal source and said control element to conduct a control signal of opposite polarity through said control element when it is closed.

References Cited by the Examiner

UNITED STATES PATENTS

| | | | |
|---|---|---|---|
| 2,888,621 | 5/1959 | McLane | 318—143 X |
| 3,108,214 | 10/1963 | Wilkerson | 318—144 |
| 3,155,891 | 11/1964 | Rosa | 318—143 |
| 3,197,688 | 7/1965 | Horner | 318—144 X |

ORIS L. RADER, *Primary Examiner.*

J. C. BERENZWEIG, *Assistant Examiner.*